United States Patent
Deetz et al.

(10) Patent No.: US 8,664,332 B2
(45) Date of Patent: Mar. 4, 2014

(54) PROCESS FOR MAKING UNIFORM OLIGOMERIC DROPLETS

(75) Inventors: Martin Deetz, North Wales, PA (US);
John J. Maikner, Zionsville, PA (US);
William J. Zabrodski, Bensalem, PA (US)

(73) Assignee: Rohm and Haas Company, Philadelphia, PA (US)

( * ) Notice: Subject to any disclaimer, the term of this patent is extended or adjusted under 35 U.S.C. 154(b) by 421 days.

(21) Appl. No.: 12/980,604

(22) Filed: Dec. 29, 2010

(65) Prior Publication Data

US 2011/0160394 A1    Jun. 30, 2011

Related U.S. Application Data

(60) Provisional application No. 61/335,014, filed on Dec. 30, 2009.

(51) Int. Cl.
*C08F 2/00*    (2006.01)
*C08F 2/24*    (2006.01)

(52) U.S. Cl.
USPC ............................................ 524/800; 526/201

(58) Field of Classification Search
USPC ............................................ 524/800; 526/201
See application file for complete search history.

(56) References Cited

U.S. PATENT DOCUMENTS

| | | | |
|---|---|---|---|
| 3,922,255 A | 11/1975 | Koestler et al. | |
| 3,988,392 A | 10/1976 | Kameda | |
| 4,186,120 A | 1/1980 | Ugelstad | |
| 4,444,961 A | 4/1984 | Timm et al. | |
| 4,459,378 A | 7/1984 | Ugelstad | |
| 4,530,956 A | 7/1985 | Ugelstad | |
| 4,542,171 A | 9/1985 | Euser et al. | |
| 4,623,706 A | 11/1986 | Timm et al. | |
| 5,147,937 A | 9/1992 | Frazza | |
| 5,237,004 A | 8/1993 | Wu | |
| 5,283,287 A | 2/1994 | Kim | |
| 5,292,844 A | 3/1994 | Young et al. | |
| 5,464,916 A | 11/1995 | Young et al. | |
| 5,616,622 A | 4/1997 | Harris | |
| 5,696,199 A | 12/1997 | Senkus et al. | |
| 5,976,405 A * | 11/1999 | Clikeman et al. | 252/299.01 |
| 6,174,929 B1 | 1/2001 | Hahnle et al. | |
| 6,245,410 B1 | 6/2001 | Hahnle et al. | |
| 6,342,561 B1 | 1/2002 | Engel et al. | |
| 6,391,429 B1 | 5/2002 | Senkus | |
| 6,503,680 B1 | 1/2003 | Chen | |
| 6,855,761 B2 | 2/2005 | Muranaka et al. | |
| 6,949,601 B1 | 9/2005 | Leth-Olsen | |
| 7,217,762 B1 | 5/2007 | Jorgedal et al. | |
| 2003/0187080 A1 | 10/2003 | Jiang et al. | |
| 2004/0069710 A1 | 4/2004 | Sirkar et al. | |
| 2005/0031871 A1 | 2/2005 | Kinsho et al. | |
| 2006/0237367 A1 | 10/2006 | Fisher et al. | |
| 2007/0066761 A1 | 3/2007 | Deetz et al. | |
| 2007/0265390 A1 | 11/2007 | Jorgedal et al. | |

FOREIGN PATENT DOCUMENTS

| | | |
|---|---|---|
| EP | 1046658 | 10/2000 |
| EP | 1568660 | 8/2005 |
| JP | 2006063222 | 3/2006 |
| WO | WO9740076 | 10/1997 |
| WO | WO2005090413 A1 | 9/2005 |

\* cited by examiner

*Primary Examiner* — Kelechi Egwim
(74) *Attorney, Agent, or Firm* — Carl P. Hemenway

(57) ABSTRACT

A process for making substantially uniform oligomeric droplets in an aqueous dispersion comprising preparing an aqueous emulsion of an emulsifying agent, at least one monomer, a chain transfer agent, and an initiator; and mixing the aqueous emulsion with a stabilizer and a plurality of seed particles.

18 Claims, No Drawings

PROCESS FOR MAKING UNIFORM OLIGOMERIC DROPLETS

This application claims the benefit of priority under 35 U.S.C. §119(e) of U.S. Provisional Patent Application No. 61/335,014 filed on Dec. 30, 2009.

This invention relates to processes for making oligomeric droplets. More particularly, this invention relates to processes for making substantially uniform oligomeric droplets.

To swell or expand seed particles, a monomer phase may be emulsified by using surfactants, such as sodium lauryl sulfate and Triton™ X-450. One method of producing swollen seed particles is disclosed in U.S. Publication No. 2007/0066761, where seed particles are mixed with a monomer, initiator, chain-transfer agent, and surfactant.

Other methods for making seed particles are disclosed in U.S. Pat. No. 4,186,120 and U.S. Pat. No. 4,530,956. Both of these patents disclose the use of anionic surfactants in the production of seed particles.

The anionic surfactants used in these methods often work well as emulsifying agents, but are generally poor stabilizers for polymerizing uniform oligomeric droplets. In addition, use of anionic surfactants may produce pooling of unincorporated monomers in the reactor, which results in oligomer droplets having particles sizes that are smaller than predicted and reproducibility of those droplets is variable.

The invention seeks to improve upon the current art by providing a process using an emulsifying agent and a stabilizer that substantially eliminates pooling monomers and extends the long-term stability of oligomeric droplets in storage.

In a first aspect of the invention, there is provided a process for making substantially uniform oligomeric droplets comprising preparing an aqueous emulsion having an emulsifying agent, at least one monomer, a chain transfer agent, and an initiator; and mixing the aqueous emulsion with at least a stabilizer, a plurality of seed particles, and an inhibitor to grow an aqueous dispersion of oligomeric droplets, having a 90/10 uniformity coefficient of 1.0 to 1.3.

In a second aspect of the invention, there is provided a process for making substantially uniform oligomeric droplets comprising preparing an aqueous emulsion having an emulsifying agent, at least one monomer, a chain transfer agent, and an initiator; and mixing the aqueous emulsion with at least a stabilizer, an inhibitor, and a plurality of seed particles to grow an aqueous dispersion of oligomeric droplets, having a 90/10 uniformity coefficient of 1.0 to 1.3. The emulsifying agent has the same composition as the stabilizer In a third aspect of the invention, there is provided an aqueous dispersion made by the process of the invention.

In a fourth aspect of the invention, there is provided oligomeric droplets prepared by the process of the invention.

The invention is directed to a process for making substantially uniform oligomeric droplets, or swollen particles. A collection of particles are "uniform" if they have the same size and shape. The 90/10 uniformity coefficient of the particle is estimated as the ratio of the particle diameters at 90% and 10% of the particle size distribution. "Substantially uniform" means that the 90/10 coefficient ranges from 1.0 to 1.3. Swollen particles are particles that readily absorb a compound and/or compounds under reaction conditions such that the particle is larger after absorbing that compound/those compounds.

In the process, the aqueous emulsion is prepared by mixing an emulsifying agent and at least one monomer. Suitable monomers include ethylenically unsaturated monomers, for example, (meth)acrylic ester monomers, including methyl acrylates, ethyl acrylates, butyl acrylates, 2-ethylhexyl acrylates, decyl acrylates, lauryl acrylates, methyl methacrylates, butyl methacrylates, ethyl methacrylates, isodecyl methacrylates, lauryl methacrylates, hydroxyethyl methacrylates, hydroxypropyl methacrylates, (meth)acrylonitriles, and (meth)acrylamides, acetoacetoxyethyl (meth)acrylates, acetoacetoxypropyl (meth)acrylates, 2-(3-oxazolidinyl)ethyl (meth)acrylates, tert-butylaminoethyl (meth)acrylates, ethyleneureido-functional monomers, allyl acetoacetates, ethylenes, propylenes, styrenes and substituted styrenes, butadienes, vinyl acetates, vinyl butyrates and other vinyl esters, vinyl monomers, such as vinyl chloride, vinyl toluene, and vinyl benzophenone, and vinylidene chloride. The term "(meth)" followed by another term such as acrylate or acrylamide, as used throughout the disclosure, refers to both acrylates or acrylamides and methacrylates and methacrylamides, respectively. Preferred monomers include butyl acrylate, styrene, and mixtures thereof.

Preferred emulsifying agents include proteins, polyvinyl alcohols, polyglycerol fatty acid esters, plant polysaccharides, cetyl trimethylammonium bromides and other alkyltrimethylammonium salts, cetylpyridinium chlorides, polyethoxylated tallow amines, benzalkonium chlorides, benzethonium chlorides, zwitterionics (amphoterics), dodecyl betaines, cocatnidopropyl betaines, coco ampho glycinates, alkyl poly(ethylene oxides), alkylphenol poly(ethylene oxides), copolymers of poly(ethylene oxide) and poly(propylene oxide), alkyl polyglucosides, including octyl glucosides and decyl maltosides, fatty alcohols, cetyl alcohols, oleyl alcohols, cocamide monoethanolamines, cocamide diethanolamines, polysorbates, codecyl dimethylamine oxides, alginic acids, sodium alginates, potassium alginates, ammonium alginates, calcium alginates, propane-1,2-diol alginates, carrageenans, locust bean gums (carob gums), guar gums, tragacanths, gum acacias (gum arabics), xanthan gums, sorbitols, mannitols, glycerol, pectins, amidated pectins, microcrystalline/powdered celluloses, methylcelluloses, hydroxypropylcelluloses, hydroxypropyl-methylcelluloses, ethylmethylcelluloses, carboxymethylcelluloses, mono- and di-glycerides of fatty acids, esters of mono-and di- glycerides of fatty acids, sucrose esters of fatty acids, sucroglycerides, polyglycerol esters of fatty acids, and propane-1,2-diol esters of fatty acids. The emulsifying agent may also include similar compositions as long as it is not an anionic surfactant. A more preferred emulsifying agent is polyvinyl alcohol.

Preferably, the emulsifying agent is provided as an aqueous dispersion of the emulsifying agent in water. The amount of emulsifying agent used ranges, preferably, from 0.1% to 10%, and more preferably, from 0.3% to 3%, by weight, based on the weight of monomer.

The aqueous emulsion may also include at least one chain transfer agent. Suitable chain transfer agents include, for example, halomethanes, disulfides, thiols (also called mercaptans), and metal complexes. Additional suitable chain transfer agents include various other compounds that have at least one readily abstractable hydrogen atom, and mixtures thereof. Chain transfer agents may be added in one or more additions or continuously, linearly or not, over most or all of the entire reaction period or during limited portions of the reaction period. The chain transfer agents may be added such that they comprise, preferably, up to 50%, and more preferably, 2% to 30%, and most preferably, 10% to 20%, by weight based on the total weight of monomer.

In addition, initiators may be used in making the aqueous emulsion. An initiator is a compound that is capable of producing at least one free radical under conditions in which that free radical can interact with the monomer. Suitable initiators include, persulfates, such as sodium persulfates and ammonium persulfates, benzoyl peroxides, t-butyl peroctoates, t-amyl peroxypivalates, cumene hydroperoxides, t-butyl peroctoates, oil-soluble peroxides, oil-soluble azo compounds, and mixtures thereof. An initiator is "oil-soluble" if it has low solubility in water of 1%, by weight, based on the weight of water, or less. In some embodiments, the amount of initiator is, preferably, between 0.1% and 8%, and more preferably, between 0.1% and 4%, by weight based on the total weight of monomer used in the process.

The at least one monomer, chain transfer agent, initiator and emulsifying agent and any other ingredients are mixed to form an emulsion. These ingredients may be mixed as is or one or more may be prepared as emulsions first and then the prepared emulsions are mixed or the ingredients may be mixed. Mixing of the emulsion may be performed by mechanical agitation, including shaking the mixture, stirring the mixture, passing the mixture through a static mixing element, ultrasonic emulsification, and contact with a rotating device. In some embodiments, the mechanical agitation provides "high shear" (i.e., it imparts a high shear rate to the ingredients).

In one example, the emulsion is pumped through an emulsifier, such as an IKA® magic LAB® inline emulsifier available from IKA Works, Inc., Wilmington, N.C., or a modular laboratory mixing system.

This emulsion is fed at a desired rate and reaction temperature and mixed with a plurality of seed particles, or swellable particles, and a stabilizer to grow aqueous dispersed substantially uniform oligomeric droplets. Inhibitors, such as aqueous phase inhibiting salts and organic compounds, and/or swellants, such as plasticizers and solvents, may also be added to the mixture.

The seed particles may be made of any material that is in particulate form and may have any composition. Preferably, the seed particles comprise at least one monomer. Suitable monomers include those listed above. The seed particles have a mean particle diameter of, preferably, 0.1-50 μm, and more preferably, 2 to 15 μm.

Stabilizers are water-soluble polymers, such as, for example, polyvinyl alcohols, cellulose ethers, and mixtures thereof. Preferred stabilizers include proteins, polyvinyl alcohols, polyglycerol fatty acid esters, plant polysaccharides, cetyl trimethylammonium bromides and other alkyltrimethylammonium salts, cetylpyridinium chlorides, polyethoxylated tallow amines, benzalkonium chlorides, benzethonium chlorides, zwitterionics (amphoterics), dodecyl betaines, cocamidopropyl betaines, coco ampho glycinates, alkyl poly (ethylene oxides), alkylphenol poly(ethylene oxides), copolymers of poly(ethylene oxide) and poly(propylene oxide), alkyl polyglucosides, including octyl glucosides and decyl maltosides, fatty alcohols, cetyl alcohols, oleyl alcohols, cocamide monoethanolamines, cocamide diethanolamines, polysorbates, codecyldimethylamine oxides, alginic acids, sodium alginates, potassium alginates, ammonium alginates, calcium alginates, propane-1,2-diol alginates, carrageenans, locust bean gums (carob gums), guar gums, tragacanths, gum acacias (gum arabics), xanthan gums, sorbitols, mannitols, glycerol, pectins, amidated pectins, microcrystalline/powdered celluloses, methylcelluloses, hydroxypropylcelluloses, hydroxypropyl-methylcelluloses, ethylmethylcelluloses, carboxymethylcelluloses, mono- and di-glycerides of fatty acids, esters of mono-and di- glycerides of fatty acids, sucrose esters of fatty acids, sucroglycerides, polyglycerol esters of fatty acids, and propane-1,2-diol esters of fatty acids.

The stabilizer may also include similar compositions as long as it is not an anionic surfactant. A more preferred stabilizer is polyvinyl alcohol.

The amount of stabilizer is, preferably, from 0.1% to 15%, and more preferably, from 5% to 15%, by weight of stabilizer, based on a dry weight of the seed particles. In some embodiments, the stabilizer and the emulsifying agent are the same ingredient. In other embodiments, the stabilizer and the emulsifying agent are different.

At any point in the process, the mixing of ingredients may be performed by any method, in any order. The ingredients may be mixed continuously as they flow through a continuous-flow reactor or added to a vessel together or individually, or gradually or suddenly to that vessel. For example, the seed particles may be in the form of an aqueous dispersion. In the process, these seed particles may be placed in the vessel and the other ingredients may be added individually to the vessel containing the seed particles. Alternatively, the ingredients may be mixed together before the mixture is added to the vessel containing the seed particles.

The polymerizarion of the aqueous dispersion may be run as a shot process or by feeding the monomers over time, as is well known in the art. The polymerization process may be conducted at from 10° C. to 100° C., but may be conducted at any conditions at which polymers are formed.

An inhibitor, and preferably, an aqueous phase inhibitor, may be mixed with the stabilizer and the seed particles. The aqueous phase inhibitors include organic and inorganic compounds or mixtures thereof that are capable of quenching free radical species in an aqueous environment.

In one example of the process, the stabilizer is mixed with the seed particles and the mixture is heated. The heated mixture is then mixed with the emulsion to form the oligomeric droplets.

In another example of the process, some or all of the at least one monomer is mixed with the seed particles using the following steps: the monomer becomes resident on or in the seed particles, possibly causing the initial particles to swell; such monomer then encounters one or more free radicals (presumably formed from one or more initiators) that are also resident on or in the initial particles; and such monomer then participates with another such monomer or monomers in a polymerization reaction.

By using the process of the invention, the long-term storage stability of the oligomeric droplets is extended, in one embodiment, at least six months and, in another embodiment, at least nine months. The process also reduces, if not eliminates, pooling monomers.

The process may be performed once or may be repeated any number of times to reach a desired particle size. For example, the process may also include making a second aqueous emulsion having a second emulsifying agent, at least one second monomer, a second chain transfer agent, and a second initiator; and adding the second aqueous emulsion to a second stabilizer and at least a portion of the oligomeric droplets to form a second aqueous dispersion of secondary oligomeric droplets, having a 90/10 uniformity coefficient of 1.0 to 1.3. In some embodiments, the process will be performed on a first set of seed particles to produce initial oligomeric droplets, which are then used as seed particles in a subsequent performance of the process to produce secondary oligomeric droplets. In such embodiments, it is contemplated that any or all of the at least one monomer, chain transfer agent, and initiator used in making the secondary oligomeric droplets may be the same as, different from, or a mixture thereof, any or all of the at least one monomer, chain transfer agent, and initiator used in making the initial oligomeric droplets. For example, the at least one second monomer may be the same or different from the at least one monomer, the second chain transfer agent may be the same or different from the chain transfer agent, the second initiator may be the same or different from the initiator, and the second aqueous emulsion may be the same or different from the aqueous emulsion.

The oligomeric droplets have a 90/10 uniformity coefficient of, preferably, 1.0 to 1.3, and more preferably, 1.05 to 1.15. The number-average molecular weight (Mn) of the oligomers ranges from 400 to 2000.

In some embodiments, the mean particle diameter of the oligomeric droplets is larger than the mean particle diameter of the seed particles. The mean particle diameter of the oligomeric droplets may be larger than the mean particle diameter of the seed particles by a factor of, preferably, at least 1.5 times or higher, more preferably, at least 2 times higher, and most preferably, at least 4 times higher. Preferably, the oligomeric droplets have a mean particle diameter of 2-100 μm. More preferably, the oligomeric droplets have a mean particle diameter of 10-30 μm. Particle size may be measured by any available method, including laser diffraction, electroresistance counting, and photoanalysis.

One use for oligomeric droplets is in the production of polymeric resin particles, and the polymeric particles thus produced are useful for one or more of a variety of purposes. Some of such polymeric resin particles may be chosen or designed to be useful, for example, for one or more of the following purposes: light scattering and/or diffusion materials, surface coatings, surface matting agents, surface gloss reducers, surface texture modifiers, plastic additives, liquid crystal display spacers, standard samples, micro filters, controlled release agents, chromatographic resins, intermediates for preparation of functionalized chromatographic resins, adsorbents, solid phase synthesis resins, catalytic enzyme supports, milling media, dispersing media, enzyme immobilization materials, resins for affinity chromatography, or ion-exchange materials.

The following examples are presented to illustrate the invention. In the examples, the following abbreviations have been used.
BA is butyl acrylate.
Da is Daltons.
D.I. is deionized.
PVOH is polyvinyl alcohol.
t-butyl is tert-butyl.
Rpm is rotations per minute.
C is Celsius; μm is micrometer or micron; ml is milliliter; g is gram; and min is minute.

TEST METHODS

Particle size: Measurements were made using a Multisizer™ 3 Coulter Counter® made by Beckman Coulter, Brea, Calif.
Pooling monomer and coalesce observation: Observations were done with the naked eye.

EXAMPLES

Example 1

Preparation of 22.5 μm Styrene/BA Oligomer Seed Using Polyvinyl Alcohol

A 2 liter glass reactor equipped with an overhead stirrer and condenser and blanked with nitrogen was charged with 1500 g of D.I. water. The reactor was heated to 80° C. and 30 g of PVOH, 87-89% hydrolyzed, with a molecular weight range of 85,000 to 124,000 Da was added slowly over 10 minutes. The PVOH solution was stirred for 1 hour at 80° C., and then cooled to 30° C. In a separate reactor, 250 g of the prepared PVOH solution, 196.6 g of butyl acrylate, 43.6 g of styrene, 43.0 g of butyl 3-mercaptopropionate, and 2.6 g of t-butyl peroctoate were charged to the reactor stirring at 400 rpm and the mixture was stirred for 10 minutes. The monomer mixture was then pumped at a rate of 50 ml/min using a FMI pump made by Fluid Metering, Inc., Syosset, N.Y. through an IKA® Magic LAB® inline emulsifier made by IKA Works, Inc., Wilmington, N.C. set a 4000 rpm; the monomer emulsion was collected in a 1 liter bottle.

In a similarly equipped 2 liter glass reactor, 450 g of the PVOH solution, 0.925 g 4-nitrophenol sodium salt, and 2.64 g of a monosized 3.8 μm polystyrene seed were charged into the reactor with stirring set at 100 rpm. The reactor was heated to 84° C. over 1 hour and then a feed of emulsified monomer mixture was pumped at a rate of 1.79 ml/min through a FMI pump for 5 hours into the reactor. At the end of the monomer feed, the line was flushed with 12 g of PVOH solution into the reactor. After the feed, the temperature was maintained at 84° C. for 6 hours and then cooled to 25° C. A particle size of 22.5 μm and a 90/10 uniformity coefficient of 1.09 were obtained. No pooling monomer was observed during or after the polymerizing and no coalesces of the seed after 6 months was observed.

Example 2

Preparation of 10.0 μm Styrene/BA Oligomer Seed Using Polyvinyl Alcohol

A 2 liter glass reactor equipped with an overhead stirrer and condenser and blanked with nitrogen was charged with 1500 g of D.I. water. The reactor was heated to 80° C. and 30 g of PVOH, 87-89% hydrolyzed, with a molecular weight range of 85,000 to 124,000 Da was added slowly over 10 minutes. The PVOH solution was stirred for 1 hour at 80° C., and then cooled to 30° C. In a separate reactor, 250 g of the prepared PVOH solution, 196.6 g of butyl acrylate, 43.6 g of styrene, 43.0 g of butyl 3-mercaptopropionate and 2.6 g of t-butyl peroctoate were charged to the reactor stirring at 400 rpm and the mixture was stirred for 10 minutes. The monomer mixture was then pumped at a rate of 50 ml/min using a FMI pump through an IKA™ Magic LAB™ inline emulsifier set at 4000 rpm; the monomer emulsion was collected in a 1 liter bottle.

In a similarly equipped 2 liter glass reactor, 450 g of the PVOH solution, 0.925 g 4-nitrophenol sodium salt, and 34.7 g of a monosized 3.8 μm polystyrene seed were charged into the reactor with stirring set at 100 rpm. The reactor was heated to 84° C. over 1 hour and then a feed of emulsified monomer mixture was pumped at a rate of 1.79 ml/min through a FMI pump for 5 hours into the reactor. At the end of the monomer feed, the line was flushed with 12 g of PVOH solution into the reactor. After the feed, the temperature was maintained at 84° C. for 6 hours and then cooled to 25° C. A particle size of 10.1 μm and a 90/10 uniformity coefficient of 1.09 were obtained. No pooling monomer was observed during or after the polymerizing and no coalesces of the seed after 6 months was observed.

Example 3

Preparation of 14.5 μm Styrene/BA Oligomer Seed Using Polyvinyl Alcohol in a 20 Liter Reactor A 20 liter stainless steel reactor equipped with an overhead stirrer and condenser and blanked with nitrogen was charged with 15,000 g of D.I. water. The reactor was heated to 80° C. and 300 g of PVOH, 87-89 hydrolyzed, with a molecular weight range of 85,000 to 124,000 Da was added slowly over 30 minutes. The PVOH solution was stirred for 1 hour at 80° C., and then cooled to 30° C. In a separate tank, 4163 g of the prepared PVOH solution, 3270 g of butyl acrylate, 726 g of styrene, 716.0 g of butyl 3-mercaptopropionate, and 43.0 g of t-butyl peroctoate were charged to the tank stirring at 200 rpm. The mixture was stirred for 10 minutes. The monomer emulsion was collected in a 20 liter tank.

In a similarly equipped 20 liter stainless steel reactor, 8415 g of the PVOH solution, 15.36 g 4-nitrophenol sodium salt and 175 g of a monosized 3.8 µm polystyrene seed were charged into the reactor with stirring set a 100 rpm. The reactor was heated to 84° C. over 1 hour and the monomer mixture was then pumped at a rate of 1782 ml/min using a FMI pump through an IKA™ MagicLAB™ inline emulsifier set at 4000 rpm to the reactor for 5 hours. At the end of the monomer feed, the line was flushed with 400 g of PVOH solution into the reactor. After the feed, the temperature was maintained at 84° C. for 6 hours and then cooled to 25° C. A particle size of 14.67 µm and a 90/10 uniformity coefficient of 1.09 were obtained. No pooling monomer was observed during or after the polymerizing and no coalesces of the seed after 9 months was observed.

Example 4

Preparation of 14.5 µm Styrene/BA Oligomer Seed Using Polyvinyl Alcohol

A 2 liter glass reactor equipped with an overhead stirrer and condenser and blanked with nitrogen was charged with 1500 g of D.I. water. A reactor was heated to 80° C. and 30 g of PVOH, 87-89 hydrolyzed, with a molecular weight range of 85,000 to 124,000 Da was added slowly over 10 minutes. The PVOH solution was stirred for 1 hour at 80° C., and then cooled to 30° C. In a separate reactor, 250 g of the prepared PVOH solution, 196.6 g of butyl acrylate, 43.6 g of styrene, 43.0 g of butyl 3-mercaptopropionate, and 2.6 g of t-butyl peroctoate were charged to the reactor stirring at 400 rpm and the mixture was stirred for 10 minutes. The monomer mixture was then pumped at a rate of 50 ml/min using a FMI pump through an IKA™ Magic LAB™ inline emulsifier set at 4000 rpm. The monomer emulsion was collected in a liter bottle.

In a similarly equipped 2 liter glass reactor, 450 g of the PVOH solution, 0.925 g 4-nitrophenol sodium salt and 34.7 g of a monosized 3.8 um polystyrene seed were charged into the reactor stirring set at 100 rpm. The reactor was heated to 84° C. over 1 hour and then a feed of emulsified monomer mixture was pumped at a rate of 1.79 ml/min through a FMI pump for 5 hours into the reactor. At the end of the monomer feed, the line was flushed with 12 g of PVOH solution into the reactor. After the feed, the temperature was maintained at 84° C. for 6 hours and then cooled to 25° C. A particle size of 14.5 µm and a 90/10 uniformity coefficient of 1.08 were obtained. No pooling monomer was observed during or after the polymerizing and no coalesces of the seed after 6 months was observed.

What is claimed is:

1. A process for making substantially uniform oligomeric droplets comprising:
preparing an aqueous emulsion having an emulsifying agent that is not an anionic surfactant, at least one monomer, a chain transfer agent, and an initiator, wherein the initiator is selected from the group consisting of benzoyl peroxides, t-butyl peroctoates, t-amyl peroxypivalates, oil-soluble peroxides, oil-solubule azo compounds, and mixtures thereof; and
mixing the aqueous emulsion with at least a stabilizer that is not an anionic surfactant and a plurality of seed particles to grow an aqueous dispersion of oligomeric droplets, having a 90/10 uniformity coefficient of 1.0 to 1.3.

2. The process of claim 1 wherein the mixing comprises:
adding the seed particles to the stabilizer to form a mixture;
heating the mixture;
feeding the aqueous emulsion into the mixture; and
increasing a particle size of the oligomeric droplets in the aqueous dispersion.

3. The process of claim 1 wherein the mixing comprises:
adding an aqueous phase inhibitor.

4. The process of claim 1 wherein the oligomeric droplets comprise a 90/10 uniformity coefficient of 1.05 to 1.15.

5. The process of claim 1 wherein the oligomeric droplets comprise a mean particle diameter of 2-100 µm.

6. The process of claim 1 further comprising:
making a second aqueous emulsion having a second emulsifying agent, at least one second monomer, a second chain transfer agent, and a second initiator;
adding the second aqueous emulsion to a second stabilizer and at least a portion of the oligomeric droplets to form a second aqueous dispersion of secondary oligomeric droplets, having a 90/10 uniformity coefficient of 1.0 to 1.3.

7. The process of claim 1 wherein the stabilizer and the emulsifying agent comprise same composition.

8. The process of claim 1, wherein the initiator is selected from the group consisting of benzoyl peroxide, t-butyl peroctoate, t-amyl peroxypivalate, oil-soluble peroxides, oil-solubule azo compounds, and mixtures thereof.

9. The process of claim 1, wherein the initiator is selected from the group consisting of benzoyl peroxide, t-butyl peroctoate, t-amyl peroxypivalate, and mixtures thereof.

10. The process of claim 1, wherein the initiator is t-butyl peroctoate.

11. The process of claim 1, wherein said emulsifying agent is selected from the group consisting of proteins, polyvinyl alcohols, plant polysaccharides, locust bean gums, guar gums, gum acacias, xanthan gums, microcrystalline/powdered celluloses, methylcelluloses, hydroxypropylcelluloses, hydroxypropyl-methylcelluloses, othylmethylcelluloses, and carboxymethylcelluloses.

12. The process of claim 1, wherein said emulsifying agent is polyvinyl alcohol.

13. The process of claim 1, wherein said stabilizer is selected from the group consisting of polyvinyl alcohols, cellulose ethers, and mixtures thereof.

14. The process of claim 1, wherein said stabilizer is selected from the group consisting of proteins, polyvinyl alcohols, plant polysaccharides, locust bean gums, guar gums, gum acacias, xanthan gums, microcrystalline/powdered celluloses, methylcelluloses, hydroxypropylcelluloses, hydroxypropyl-methylcelluloses, ethylmethylcelluloses, and carboxymethylcelluloses.

15. The process of claim 14, wherein said emulsifier is selected from the group consisting of proteins, polyvinyl alcohols, plant polysaccharides, locust bean gums, guar gums, gum acacias, xanthan gums, microcrystalline/powdered celluloses, methylcelluloses, hydroxypropylcelluloses, hydroxypropyl-methylcelluloses, ethylmethylcelluloses, and carboxymethylcelluloses.

16. The process of claim 1, wherein said stabilizer is polyvinyl alcohol.

17. The process of claim 1, wherein said oligomeric droplets comprise oligomer having number-average molecular weight of 400 to 2000.

18. A process for making substantially uniform oligomeric droplets comprising:
preparing an aqueous emulsion having an emulsifying agent that is not an anionic surfactant, at least one monomer, a chain transfer agent, and an initiator, wherein the initiator is selected from the group consisting of benzoyl peroxides, t-butyl peroctoates, t-amyl peroxypivalates, oil-soluble peroxides, oil-solubule azo compounds, and mixtures thereof;
and
mixing the aqueous emulsion with at least a stabilizer that is not an anionic surfactant, an inhibitor, and a plurality of seed particles to grow an aqueous dispersion of oligomeric droplets, having a 90/10 uniformity coefficient of 1.0 to 1.3,
wherein the emulsifying agent and the stabilizer comprise a same composition.

* * * * *